United States Patent Office 3,055,774
Patented Sept. 25, 1962

3,055,774
METHOD OF RENDERING CELLULOSE FABRICS WATER-REPELLENT AND CREASE-RESISTANT
John W. Gilkey and Edwin P. Plueddemann, Midland, Mich., assignors to Dow Corning Corporation, Midland, Mich., a corporation of Michigan
No Drawing. Filed Sept. 1, 1960, Ser. No. 53,383
6 Claims. (Cl. 117—143)

This invention relates to the use of epoxy-functional silicon compositions for textile treatment.

It is the object of this invention to introduce a novel crease-resistant treatment for cellulose fabrics. Another object is an improved water repellent treatment for cellulose fabrics. The development of a commercial use for epoxy-silicon compounds is also sought. Other objects and advantages of this invention are detailed in or will be apparent from the following disclosure and appended claims.

This invention comprises applying water dispersible epoxy-functional silicon compounds on cellulose fabrics and curing said compounds.

The epoxy-functional silicon compounds employed herein are water soluble or can be dispersed in water to form stable oil-in-water type emulsions. Operable silicon compounds include silanes of the formula

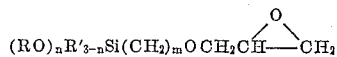

where each R and each R′ are aliphatic hydrocarbon radicals of less than 4 carbon atoms, $n$ is 2 or 3 and $m$ is 2 or 3. The preferred silanes are those wherein each R is an aliphatic hydrocarbon radical of less than 4 carbon atoms and R′ is methyl. The defined silanes are water soluble.

Also operable are disiloxanes of the formula

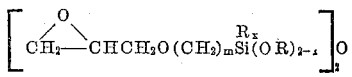

where R and $m$ are as above defined and $x$ is 0, 1 or 2. Generally the defined disiloxanes are employed in oil-in-water type emulsifiers which can be prepared in any desired manner.

A third group of materials operable herein are reaction products of methyl hydrogensiloxane polymers and allyl glycidyl ether. The linear methyl hydrogen polysiloxanes of relatively low viscosity (i.e. below 500 cs. at 25° C.) can be reacted with allyl glycidyl ether

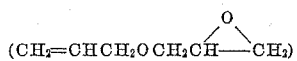

employing a platinum catalyst. The addition reaction produces

groups at the HSi sites in the polymer. However, it is preferred to employ the allyl glycidyl ether in proportions such that not more than one-half of the hydrogen atoms bonded to silicon will enter into the addition reaction. The polymer so produced can be represented by a general unit formula as

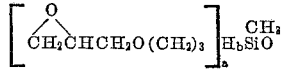

wherein $a+b=1$, $a$ is greater than 0 and not more than .5 and $b$ is at least .5 and less than 1.0. The corresponding vinyl glycidyl ether-methylhydrogensiloxane adducts can also be prepared and employed herein. The polysiloxanes defined above can be emulsified by any desired means.

The epoxy-functional silicon compound can be cured by heat alone but it is preferred to include a catalytic quantity of curing catalyst in the aqueous systems employed. Operative catalysts include metal salts of strong acids including zinc-, magnesium-, aluminum-, copper-, nickel-, cadmium-, lead- and mercuric fluoroborate and hydrates of such salts; metal perchlorates, metallic sulfates and metallic nitrates.

The silicon compound is dissolved or emulsified in an aqueous system with or without the catalyst and is applied to the cellulosic fabric by any desired means such as padding, dipping, rolling, spraying, etc. The water is evaporated from the treated cloth and the dried cloth is heated at 200° to 500° F. for 1 to 60 minutes to cure the silicon compound.

When cured, the water-soluble epoxy-functional silicon compositions impart crease resistance to the cellulose fabric. In addition to the noted crease resistance, the epoxy-silicon materials generally also provide a more durable water-repellent surface when employed in conjunction with standard organosilicon emulsions. The epoxy-silicon composition can be applied before or simultaneously with the application of the standard organosilison emulsion.

The standard organosilicon emulsions operable herein include those materials disclosed and claimed in United States Patents Nos. 2,588,365 and 2,588,366, issued March 11, 1952; No. 2,728,692, issued December 27, 1955; No. 2,807,601, issued September 24, 1957; No. 2,884,393, issued April 28, 1959; No. 2,833,022, issued May 6, 1958; and No. 2,842,509, issued July 8, 1959 and applications Serial No. 662,336, filed May 29, 1957, and Serial No. 738,599, filed May 29, 1958, all assigned to Dow Corning Corporation, and Patent No. 2,789,956, issued April 23, 1957, assigned to Wacker-Chemie G.m.b.H. Formulation, application to fabric and cure of the standard organosilicon emulsions follow known and widely published procedures, the sole variation being the prior application and cure or simultaneous application and cure of the epoxy-silicon materials of this invention.

The following examples are included to aid those skilled in the art in understanding and practicing this invention. The examples do not delineate or limit the scope of the invention which is defined in the appended claims. All parts and percentages in the examples are based on weight unless otherwise specified.

EXAMPLE 1

Pieces of cotton fabric having 80 threads per inch in warp and fill were padded with aqueous solutions of

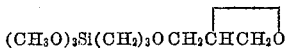

and zinc fluoroborate. The treated cotton fabric pieces were air dried and then heated at 300° F. for 5 to 10 minutes to cure the silane. The wrinkle recovery of the treated fabric pieces was then evaluated by means of the wrinkle recovery tester in accordance with A.S.T.M. test method D1295–53T (Bulletin T30–45.1, Monsanto Wrinkle Recovery Tester, Monsanto Chemical Co.). The results are tabulated in Table I.

*Table I*

| Proportion Silane | Proportion Zn (BF₄)₂·6H₂O | Cure—300° F. Time (min.) | Wrinkle Recovery Sum of Warp+Fill, degrees |
|---|---|---|---|
| Control: 0 | 0 | | 114 |
| 2.0 | 0.5 | 10 | 133 |
| 4.0 | 1.0 | 10 | 212 |
| 4.0 | 0.8 | 10 | 166 |
| 8.0 | 1.6 | 10 | 196 |
| 11.4 | 0.48 | 5 | 191 |
| 16.1 | 3.2 | 10 | 244 |
| 22.9 | 2.3 | 15 | 252 |

The improvement in wrinkle resistance resulting from the epoxy silane treatment is apparent from the results.

EXAMPLE 2

Pieces of the cotton fabric employed in Example 1 were padded with an aqueous solution of 2.86% of the silane and 0.28 of the zinc fluoroborate of Example 1. The fabric pieces were air dried and heated at 300° F. for 10 minutes. Pieces of the fabric so treated and untreated pieces of the same fabric as controls, were treated with an aqueous emulsion pad bath containing .856% hydroxylated dimethylsiloxane of less than 5000 cs. viscosity at 25° C., 1.284% methylhydrogensiloxane fluid, 0.178% zinc 2-ethylhexanoate, 0.056% dibutyltindiacetate with 0.127% polyvinyl alcohol as emulsifying agent, and 0.0084% sodium lauryl sulfate. The fabric pieces were dried and heated at 300° F. for 5 minutes. The spray rating (AATCC standard test method 22–41) of the fabric pieces was checked without further treatment and after 1, 3 and 5 accelerated washing in a Najort reversing wheel washer at 160° F. employing a commercial soap (25 g.) and sodium hexametaphosphate (10 g.) in twelve gallons of water. The results are tabulated in Table II.

*Table II*

| | Spray Rating of Treated Cotton Fabric after 160° F. Washings | | | |
|---|---|---|---|---|
| No. of Washings | 0 | 1 | 3 | 5 |
| No Pretreatment | 100 | 80 | 50 | 50 |
| With Pretreatment | 100 | 90 | 70 | 70 |

The pretreatment of the cotton fabric with the epoxyfunctional silane imparted durability to the subsequent water-repellent treatment with a siloxane of a commercial type.

EXAMPLE 3

An emulsion was prepared from 40 parts

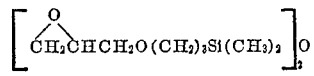

in 58 parts water with 2 parts of a trimethylnonylether of polyethylene glycol as emulsifying agent. This emulsion was further diluted with water to give 1% of the disiloxane in water and 0.1% zinc fluoroborate hexahydrate was added to the emulsion so prepared. Pieces of cotton fabric were padded with the dilute emulsion, dried and cured by heating at 300° F. for 10 minutes. Other pieces of cotton fabric were treated with a .1% aqueous solution of zinc fluoroborate hexahydrate, dried and then padded with a 1% toluene solution of the disiloxane

The cotton fabric was again dried and cured at 300° F. for 10 minutes.

The cotton pieces treated as above were treated with an aqueous emulsion pad bath containing .856% hydroxylated dimethylsiloxane, 1.284% methylhydrogensiloxane, 0.178% zinc 2-ethylhexanoate, 0.056% dibutyltindiacetate, 0.127% polyvinyl alcohol and 0.0084% sodium lauryl sulfate as in Example 2. The cotton pieces were air-dried and cured at 300° F., for 5 minutes. Initial spray ratings and spray ratings after 1, 3 and 5 accelerated 160° F. washings as described in Example 2, were measured and the results are tabulated below.

*Table III*

| Pretreatment | Spray Rates | | | |
|---|---|---|---|---|
| | Initial | 1 wash | 3 washes | 5 washes |
| With aqueous emulsion | 100 | 80 | 70 | 70 |
| With toluene solution | 100 | 80 | 90 | 70 |

EXAMPLE 4

A fluid organosiloxane copolymer of about equimolar proportions of

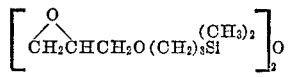

units and H(CH₃)SiO units was prepared by reacting allylglycidyl ether with methylhydrogensiloxane in a ratio of 1 mol ether per 2 mols siloxane. The fluid copolymer was emulsified employing a trimethylnonyl ether of polyethylene glycol as emulsifying agent to give an aqueous emulsion containing 3 parts siloxane per 10 parts emulsion. Cotton fabric was padded with this emulsion and zinc fluoroborate hexahydrate in proportions noted in Table IV. The treated fabric was dried and cured at 300° F. for 10 minutes. The treated fabric was then further padded with an aqueous emulsion containing 2.86% siloxane solids comprising 60% methylhydrogensiloxane fluid and 40% hydroxylated dimethylsiloxane fluid and 1.4% catalyst comprised of 12.7% zinc 2-ethylhexanoate, 40% dibutyltindiacetate, 1.88% polyvinyl alcohol and 0.125% sodium lauryl sulfate. The fabric was again dried and cured at 300° F. for 10 minutes. Spray ratings (AATCC standard test method 22–41) were measured as in Example 2.

*Table IV*

| Pretreatment | | Spray Rates after washes | | |
|---|---|---|---|---|
| Emulsion (g.) | Zn(BF₄)·6H₂O (g.) | Initial | 1 | 2 |
| 0 | 0 | 100 | 70 | 50 |
| .2 | 0.007 | 90 | 90 | 80 |
| .4 | 0.013 | 90 | 90 | 80 |
| .8 | 0.025 | 90 | 90 | 80 |
| 1.7 | 0.050 | 90 | 90 | 80 |

EXAMPLE 5

A pad bath was prepared with (1) 10 parts of a 30% solids aqueous emulsion of a siloxane mixture containing 6 parts methylhydrogensiloxane fluid and 4 parts hydroxylated dimethylsiloxane fluid, (2) 1.5 parts of an aqueous emulsion containing 12.7% zinc 2-ethylhexanoate and 4% dibutyltindiacetate, (3) 128 parts water, and (4) 0.5 parts

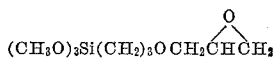
$(CH_3O)_3Si(CH_2)_3OCH_2CHCH_2$

Cotton cloth was padded with the pad bath, dried and cured at 300° F. for 10 minutes. The spray rates initially and after 1, 3 and 5 accelerated washings at 160° F. were respectively 100, 90, 80 and 50. The spray rates attained with control cotton pieces similarly treated but without the epoxy-functional silane were 100, 80, 50 and 50. The presence of the epoxy-functional silane improved the durability of the water repellent treatment.

EXAMPLE 6

An emulsion was prepared employing 60 parts of a hydroxylated dimethylsiloxane of 3020 cs. viscosity at 25° C., 3 parts of a methylhydrogensiloxane-allyl glycidyl ether adduct having 1.7 mols HSi per mol of epoxy adduct in the molecules, 3,6 parts of a trimethylnonyl ether of polyethylene glycol and 143 parts water. Pieces of cotton fabric were padded in pad baths prepared by adding (1) 6.7 parts of the above emulsion and (2) as a catalyst (a) .127 part zinc 2-ethylhexanoate, .04 part dibutyltindiacetate with .09 part polyvinyl alcohol and .006% sodium lauryl sulfate, (b) catalyst (a) plus 1 part of 16% zinc fluoroborate hexahydrate; or (c) catalyst (a) plus .5 part zinc nitrate flake, to (3) sufficient water to give 100 parts pad bath. The treated cotton pieces were dried and cured at 350° F. for 2 minutes. Spray ratings were measured initially and after 1, 2 and 3 washings at 212° F. employing a Najort reversing wheel washer and a commercial soap (30 g.), sodium carbonate (20 g.), sodium hexametaphosphate (10 g.) and 12 gallons of water. The results are tabulated in Table V.

*Table V*

| Catalyst | Spray Rates | | | |
|---|---|---|---|---|
| | Initial | 1 wash | 2 washes | 3 washes |
| a | 100 | 70 | 50 | 50 |
| b | 100 | 70 | 50 | 50 |
| c | 100 | 70 | 50 | 50 |

Treatment with commercial siloxane water repellents in the absence of the epoxy-functional siloxane produces initial water repellency comparable to that achieved in this example but the water repellency is reduced to zero after a single wash in accordance with this example.

That which is claimed is:

1. In the method of rendering cellulose fabrics durably water repellent the innovation consisting essentially of applying thereto from a water system an epoxy-functional silicon compounds selected from the group consisting of silicon compounds of the formulae

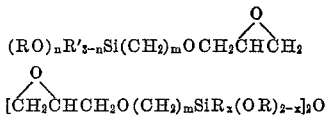
$(RO)_nR'_{3-n}Si(CH_2)_mOCH_2CHCH_2$ $[CH_2CHCH_2O(CH_2)_mSiR_x(OR)_{2-x}]_2O$ and polymers of

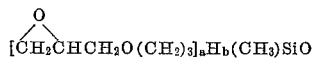
$[CH_2CHCH_2O(CH_2)_3]_aH_b(CH_3)SiO$ units, wherein each R and each R' are aliphatic hydrocarbon radicals of less than 4 carbon atoms, n is an integer greater than 1 and less than 4, m is an integer greater than 1 and less than 4, x is selected from 0, 1 and 2, a is greater than 0 and not more than .5 and b is at least .5 and less than 1.0.

2. The method of claim 1 further characterized in that silicone water repellents selected from the group consisting of polymeric diorganosiloxane fluids and organohydrogensiloxane fluids are applied to the cellulose fabric and cured.

3. A method consisting essentially of applying to a cellulose fabric an aqueous system containing (1) an epoxy-functional silicon compound selected from the group consisting of compounds of the formulae

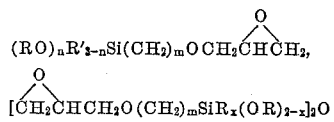
$(RO)_nR'_{3-n}Si(CH_2)_mOCH_2CHCH_2,$ $[CH_2CHCH_2O(CH_2)_mSiR_x(OR)_{2-x}]_2O$ and polymers of the unit formula

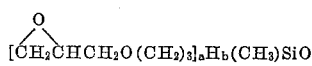
$[CH_2CHCH_2O(CH_2)_3]_aH_b(CH_3)SiO$ wherein each R and each R' are aliphatic hydrocarbon radicals of less than 4 carbon atoms, n is an integer greater than 1 and less than 4, m is an integer greater than 1 and less than 4, x is selected from 0, 1 and 2, a is greater than 0 and not more than 0.5 and b is at least 0.5 and less than 10 and (2) a catalytic amount of a metal salt of a strong acid and thereafter curing the silicon compound by heating to 200°–500° F. for less than 60 minutes.

4. The method of claim 3 wherein the epoxy-functional silicon compound has the formula

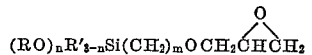
$(RO)_nR'_{3-n}Si(CH_2)_mOCH_2CHCH_2$ where R, R', n and m are as defined in claim 5.

5. The method of claim 3 wherein the epoxy-functional silicon compound has the formula

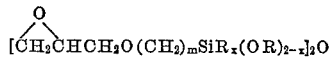
$[CH_2CHCH_2O(CH_2)_mSiR_x(OR)_{2-x}]_2O$ where each R is an aliphatic hydrocarbon radical of less than 4 carbon atoms, m is an integer greater than 1 and less than 4, and x is selected from 0, 1 and 2.

6. The method of claim 3 wherein the epoxy-functional silicon compound is a polymer of the unit formula

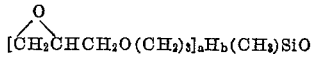
$[CH_2CHCH_2O(CH_2)_3]_aH_b(CH_3)SiO$ where a is greater than 0 and not more than 0.5 and b is at least 0.5 and less than 1.0.

References Cited in the file of this patent

UNITED STATES PATENTS

| | | |
|---|---|---|
| 2,588,366 | Dennett | Mar. 11, 1952 |
| 2,730,532 | Martin | Jan. 10, 1956 |

UNITED STATES PATENT OFFICE
CERTIFICATE OF CORRECTION

Patent No. 3,055,774            September 25, 1962

John W. Gilkey et al.

It is hereby certified that error appears in the above numbered patent requiring correction and that the said Letters Patent should read as corrected below.

Column 1, line 44, for "emulsifiers" read -- emulsions --; column 6, line 33, for "10" read -- 1.0 --.

Signed and sealed this 16th day of April 1963.

(SEAL)
Attest:

ERNEST W. SWIDER
Attesting Officer

DAVID L. LADD
Commissioner of Patents